Jan. 24, 1928.

C. A. SEARLE 1,656,993

SILENT BRIDGE BIDDING BOARD

Filed May 6, 1926

Fig. 1.

INVENTOR
CHARLES A. SEARLE

BY
Knight
ATTORNEYS

WITNESS
Oliver N. Holmes

Patented Jan. 24, 1928.

1,656,993

UNITED STATES PATENT OFFICE.

CHARLES A. SEARLE, OF WESTFIELD, NEW JERSEY.

SILENT BRIDGE BIDDING BOARD.

Application filed May 6, 1926. Serial No. 107,145.

This invention relates in general to apparatus or equipment for the playing of auction bridge, and has more particular relation to the bidding or naming of the trump.

The object of the invention, stated generally, is to increase the interest in the game. A serious fault in the game as ordinarily played resides in the oral method of bidding, in which a player may improperly indicate by tone of voice a strength or weakness in his bid, without, perhaps, committing an actual breach of the rules. In a similar manner, the questioning of an opponent or partner as to a bid which has been orally made and, perhaps, not understood, may be made in a tone of voice which can improperly serve as an indication of strength or weakness in the player's hand. Other faults with the ordinary system of oral bidding are in the bidding out of turn, the accidental expression of an illegal bid such as one lower than a previous bid by another player, and the occasional uncertainty as to the number of tricks bid after the hand has been played.

By the present invention I eliminate oral bidding and substitute a bidding board and a set of markers by which the bids are silently recorded, thus eliminating unfair indications of strength or weakness in the bidding and failure to recollect the bidding, and reducing the likelihood of a player bidding out of turn. Further features of the invention reside in the provision of means to indicate the dealer, special forms of markers, and the association of the score sheet with the bidding board.

According to my invention, a bidding board is provided for each table, this board comprising a group of spaces indicating the four suits and no-trump (hereinafter referred to in their entirety as the trumps) and the number of tricks bid. For use in conjunction with this group of spaces, I prefer to provide with the bidding board a system of markers which the players are to place in the spaces selected to indicate their bids. Spaces are also provided to indicate passes, and another group of spaces may be provided to indicate the dealer, all of which will be more clearly understood with reference to a specific example set forth by way of illustration in the accompanying drawing, in which:

Figure 1 is a face view of a bidding board embodying the principles of my invention.

Figure 2 is a transverse section thereof with two of the markers shown in position thereon.

Figure 3 is a perspective view showing a group of markers in the form of square topped pegs which may be employed by one of the players.

Figure 4 is a perspective view of a group of round topped pegs which may be employed as markers by another player.

Figure 5 is a top plan view of four different types of marking as well as shaping of the pegs, which may be employed as markers by the four respective players.

Referring in detail to said drawing, the board 10, which may be constructed of any suitable material such as wood, hard rubber or other plastic composition, has on its face a chart or group of spaces 11 in which the successive suits and no-trump (all herein referred to as trumps) are successively presented in seven transverse rows, and the numbers of tricks bid are successively presented in five vertical columns. Thus, one club, one diamond, one heart, one spade and one no-trump occur on the uppermost row and respectively under them are the successive numbers of tricks in the same order of suit and no-trump. Below the group 11 of spaces representing trump and number of tricks, are the group of pass spaces 12. Above the group of spaces representing trump and number of tricks, I may provide for the indication of the dealer by means of a space for receiving the marker of an individual player who has the deal, or a group of four of such spaces as indicated at 13, identifying the individual players by color and initial, so that the player having the deal may insert one of his markers into the dealer space representing such player.

As an additional feature, the board may be provided with a score sheet 14. It is, of course, intended that the score will be recorded in writing as the game progresses, and this being in view at all times will eliminate ignorance of the score on the part of any of the players.

Referring to Figures 2, 3, 4 and 5, I have here shown in more or less detail the style of markers which I find satisfactory, but I do not wish to indicate that these particular types of marker need be employed, as the broad features of the invention are not dependent upon any particular style of marker. The board 10 is shown in section in Figure 2, where it will be clearly seen that holes or recesses 15 are provided, one in each of the bidding, passing and dealer spaces for the reception of markers in the form of pegs 16 and 17. Two sets of pegs 16 are, in the present example, provided with square tops to distinguish them from two sets of pegs of the type illustrated at 17, which have round tops. It is intended that four groups of pegs be provided, two groups being square and two groups being round at the top, as already stated. The two groups of square topped pegs are to be used by partners, for example, those occupying the positions North and South at the table, whereas the two groups of round topped pegs are to be employed by the partners occupying the positions East and West at the table. One group of square topped pegs will be colored, for example, white, to indicate the player North and may, furthermore, have the initial "N" on its top surface. In similar manner the other group of square topped pegs may be colored brown to represent the South player and have the initial "S" on the top. One group of round topped pegs may be colored green and provided on the top with the initial "E" to indicate the East player, while the other group of round topped pegs may be colored blue and have the initial "W" on the top to indicate the West player. Each of the pegs is provided in the preferred form with a recess 18 at its top surface, whereby the different pegs are made readily superimposible one upon another for indicating a double or a redouble.

Assuming the example of the invention thus far described, the use of the markers will now be explained. In the first place, the deal may, for example, reside in the player occupying the East position, and one of the pegs of this player will accordingly be placed in the position marked "E" and colored green on the board. At the conclusion of the dealing, the bidding commences by the East player who may, for example, bid one no-trump by placing one of his pegs in the space in the upper right hand corner of the group 11 of bid spaces which represents the bid of one no-trump. East's bid is followed by South who may, for example, insert one of his pegs in the space representing a bid of two hearts. West may follow by placing one of his pegs in the space representing two no-trump, and be followed by North who places one of his pegs in, for example, a space of the group 12 indicating a pass. In this way the bidding is done without the necessity of a spoken word and the placing of the pegs upon the board by the successive bidders continues until the bidding is completed. Where it is intended to indicate a double, the player wishing to express the bid does so by inserting his peg into the recess in the top of the peg which is already in the space indicating the bid which he wishes to double. In the same way a redouble would be indicated by a player placing one of his pegs in the top of the second peg.

The number of pegs provided for each player is immaterial, so long as his supply is ample to take care of the number of bids which he may be called upon to make. I have found, as a matter of practical use, that six pegs or markers for each player take care of the requirements. It is intended that the pegs be left in position until the completion of the playing of the hand, thus recording, for the time being, the bidding of the hand and avoiding all question as to the contract or the preliminary bids.

Obviously any other manner of making the indication of the player's bid in the corresponding space on the group of bidding spaces may be employed within the broad scope of my invention, but the insertion of pegs indicating the respective players is a preferred embodiment of the style of marker employed. The identification of partners by the shape of the peg, and the identification of individual players by the color and initial, render the indications or interpretation of the bidding more intelligible and graphic, thus increasing the interest in the game.

I claim:—

1. A bridge bidding board comprising a group of spaces progressing transversely and vertically, indicating in one of said directions the different trumps to be named and in the other of said directions the different numbers of tricks to be bid, and markers for placement in selected spaces to express the bids of the players.

2. A bridge bidding board comprising a group of spaces progressing transversely and vertically, indicating successively in one of said directions the different trumps to be named and successively in the other of said directions the different numbers of tricks to be bid, and player-identifying markers for placement in selected spaces to express the bids of the respective players.

3. A bridge bidding board comprising a group of spaces arranged in rows and columns to indicate by position the trump and number of tricks bid, and a set of markers for placement in selected spaces to express the bids of the players.

4. A bridge bidding board comprising a group of spaces arranged in rows and columns to indicate by position the trump and number of tricks bid, and a set of player-identifying markers for placement in selected spaces to express the bids of the respective players.

5. A bridge bidding board comprising spaces to indicate the trump and number of tricks to be bid, a group of spaces to indicate passes, and markers identifying the individual players, for placement in selected spaces to indicate the bid of the respective players.

6. A bridge bidding board comprising indicating spaces, and four sets of markers, two of said sets of markers having a common identification to indicate partners and individual identifications to indicate the respective players.

CHARLES A. SEARLE.